United States Patent
Nagayama et al.

(10) Patent No.: US 10,493,845 B2
(45) Date of Patent: Dec. 3, 2019

(54) DRIVE FORCE CONTROL DEVICE AND METHOD OF CONTROLLING VEHICLE

(71) Applicant: JTEKT Corporation, Osaka-shi, Osaka (JP)

(72) Inventors: Go Nagayama, Toyama (JP); Akira Kodama, Chiryu (JP)

(73) Assignee: JTEKT CORPORATION, Osaka (JP)

(*) Notice: Subject to any disclaimer, the term of this patent is extended or adjusted under 35 U.S.C. 154(b) by 163 days.

(21) Appl. No.: 15/807,620

(22) Filed: Nov. 9, 2017

(65) Prior Publication Data

US 2018/0134152 A1 May 17, 2018

(30) Foreign Application Priority Data

Nov. 11, 2016 (JP) .................... 2016-220614

(51) Int. Cl.
  B60K 17/16 (2006.01)
  B60W 40/072 (2012.01)
  (Continued)

(52) U.S. Cl.
  CPC .............. B60K 17/20 (2013.01); B60K 17/02 (2013.01); B60K 17/35 (2013.01); B60K 17/351 (2013.01);
  (Continued)

(58) Field of Classification Search
  CPC ............... B60W 30/04; B60W 30/045; B60W 2510/207; B60W 2540/18; B60W 40/06; B60W 40/064; B60W 40/068; B60W 40/072; B60W 2720/406; B60W 10/16; B60W 10/02; B60W 10/023; B60W 10/026; B60W 2300/18; B60W 2300/185; B60W 2520/406; B60K 2023/043
  See application file for complete search history.

(56) References Cited

U.S. PATENT DOCUMENTS 9,796,383 B2 * 10/2017 Fairgrieve ........... B60W 30/146
2014/0058643 A1 * 2/2014 Kodama ................. G06F 17/00
701/82
(Continued)

FOREIGN PATENT DOCUMENTS

JP   2014-40852   3/2014

*Primary Examiner* — Thomas G Black
*Assistant Examiner* — Sara J Lewandroski
(74) *Attorney, Agent, or Firm* — Oblon, McClelland, Maier & Neustadt, L.L.P.

(57) ABSTRACT

A drive force control device, which controls a drive force distribution device that distributes a drive force to right and left rear wheels at variable distribution ratios, computes a steering angle-based turning radius determined in accordance with a steering angle, computes a limit turning radius, which is a minimum value of the turning radius with which the vehicle is turnable while keeping a stable travel state, in accordance with a vehicle speed, sets the larger one of the steering angle-based turning radius and the limit turning radius as a target turning radius, computes target rotational speeds for the right and left rear wheels on the basis of the target turning radius and the vehicle speed, and adjusts the ratios of distribution of the drive force to the right and left rear wheels such that actual rotational speeds of the right and left rear wheels approximate the target rotational speeds.

5 Claims, 7 Drawing Sheets

(51) Int. Cl.
*B60W 30/045* (2012.01)
*B60K 23/04* (2006.01)
*B60W 40/068* (2012.01)
*B60K 17/02* (2006.01)
*B60K 17/35* (2006.01)
*B60K 17/34* (2006.01)
*B60K 23/08* (2006.01)

(52) U.S. Cl.
CPC ........... *B60K 23/04* (2013.01); *B60W 30/045* (2013.01); *B60W 40/068* (2013.01); *B60W 40/072* (2013.01); *B60K 17/34* (2013.01); *B60K 2023/043* (2013.01); *B60K 2023/0858* (2013.01); *B60W 2520/10* (2013.01); *B60W 2540/10* (2013.01)

(56) References Cited

U.S. PATENT DOCUMENTS

| | | | |
|---|---|---|---|
| 2014/0297146 A1* | 10/2014 | Murakami | B60K 23/0808 701/69 |
| 2015/0032335 A1* | 1/2015 | Kodama | B60W 10/20 701/42 |
| 2015/0191158 A1* | 7/2015 | Vorreiter | B60T 8/172 701/72 |
| 2016/0159347 A1* | 6/2016 | Lavoie | B60W 10/18 701/41 |
| 2018/0056996 A1* | 3/2018 | Lee | B60T 8/17557 |

* cited by examiner

DRIVE FORCE CONTROL DEVICE AND METHOD OF CONTROLLING VEHICLE

INCORPORATION BY REFERENCE

The disclosure of Japanese Patent Application No. 2016-220614 filed on Nov. 11, 2016 including the specification, drawings and abstract, is incorporated herein by reference in its entirety.

BACKGROUND OF THE INVENTION

1. Field of the Invention

The present invention relates to a drive force control device that can distribute a drive force of a drive source to right and left wheels of a vehicle at variable distribution ratios, and to a method of controlling a vehicle.

2. Description of the Related Art

There has hitherto been known a control device described in Japanese Patent Application Publication No. 2014-40852 (JP 2014-40852 A) as a control device that controls a drive force transfer device that transfers a drive force to right and left wheels of a vehicle.

The drive force transfer device described in JP 2014-40852 A includes a turning radius estimation unit, a target slip angle computation unit, a target rotational speed computation unit, and a drive force control unit. The turning radius estimation unit estimates a turning radius of the vehicle on the basis of the steering angle of a steering wheel etc. The target slip angle computation unit computes a target slip angle in accordance with the estimated turning radius. The target rotational speed computation unit computes respective target rotational speeds for the right and left wheels on the basis of the target slip angle and the vehicle speed. The drive force control unit controls drive forces to be transferred to the right and left wheels such that the actual rotational speeds of the right and left wheels approximate the target rotational speeds.

With the drive force control device described in JP 2014-40852 A, the behavior of the vehicle during a turn can be stabilized. However, if the steering angle becomes larger than an angle at which the vehicle is able to turn while keeping a stable travel state, such as in the case where the steering wheel is operated greatly during a turn at a high speed, for example, the effect in stabilizing the behavior of the vehicle may not always be fully demonstrated.

SUMMARY OF THE INVENTION

It is an object of the present invention to provide a drive force control device that is capable of stabilizing the behavior of a vehicle compared to the case where drive forces to be transferred to right and left wheels are controlled such that the actual rotational speeds approximate target rotational speeds that match a steering angle, and a method of controlling a vehicle.

An aspect of the present invention provides a drive force control device that controls a drive force distribution device that distributes a drive force of a drive source to right and left wheels of a vehicle at variable distribution ratios.

The drive force control device includes:
a first turning radius computation unit that computes a steering angle-based turning radius that is a turning radius of the vehicle determined in accordance with a steering angle;

a second turning radius computation unit that computes a limit turning radius, which is a minimum value of the turning radius with which the vehicle is turnable while keeping a stable travel state, in accordance with a vehicle speed;

a target turning radius setting unit that sets the steering angle-based turning radius as a target turning radius in the case where the steering angle-based turning radius is larger than the limit turning radius, and that sets the limit turning radius as the target turning radius in the case where the steering angle-based turning radius is smaller than the limit turning radius;

a target rotational speed computation unit that computes respective target rotational speeds for the right and left wheels on the basis of the target turning radius, which is set by the target turning radius setting unit, and the vehicle speed; and a drive force distribution ratio adjustment unit that adjusts the ratios of distribution of the drive force to the right and left wheels such that actual rotational speeds of the right and left wheels approximate the target rotational speeds.

Another aspect of the present invention provides a method of controlling a vehicle that includes a drive force distribution device that distributes a drive force of a drive source to right and left wheels at variable distribution ratios.

The control method includes:
computing a steering angle-based turning radius that is a turning radius of the vehicle determined in accordance with a steering angle;

computing a limit turning radius, which is a minimum value of the turning radius with which the vehicle is turnable while keeping a stable travel state, in accordance with a vehicle speed;

setting the larger one of the steering angle-based turning radius and the limit turning radius as a target turning radius;

computing respective target rotational speeds for the right and left wheels on the basis of the target turning radius and the vehicle speed; and adjusting the ratios of distribution of the drive force to the right and left wheels such that actual rotational speeds of the right and left wheels approximate the target rotational speeds.

With the drive force control device and the method of controlling a vehicle according to the aspects described above, it is possible to stabilize the behavior of the vehicle compared to the case where drive forces to be transferred to right and left wheels are controlled such that the actual rotational speeds approximate target rotational speeds that match a steering angle.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described with reference to FIGS. 1 to 4.

Figure 1:
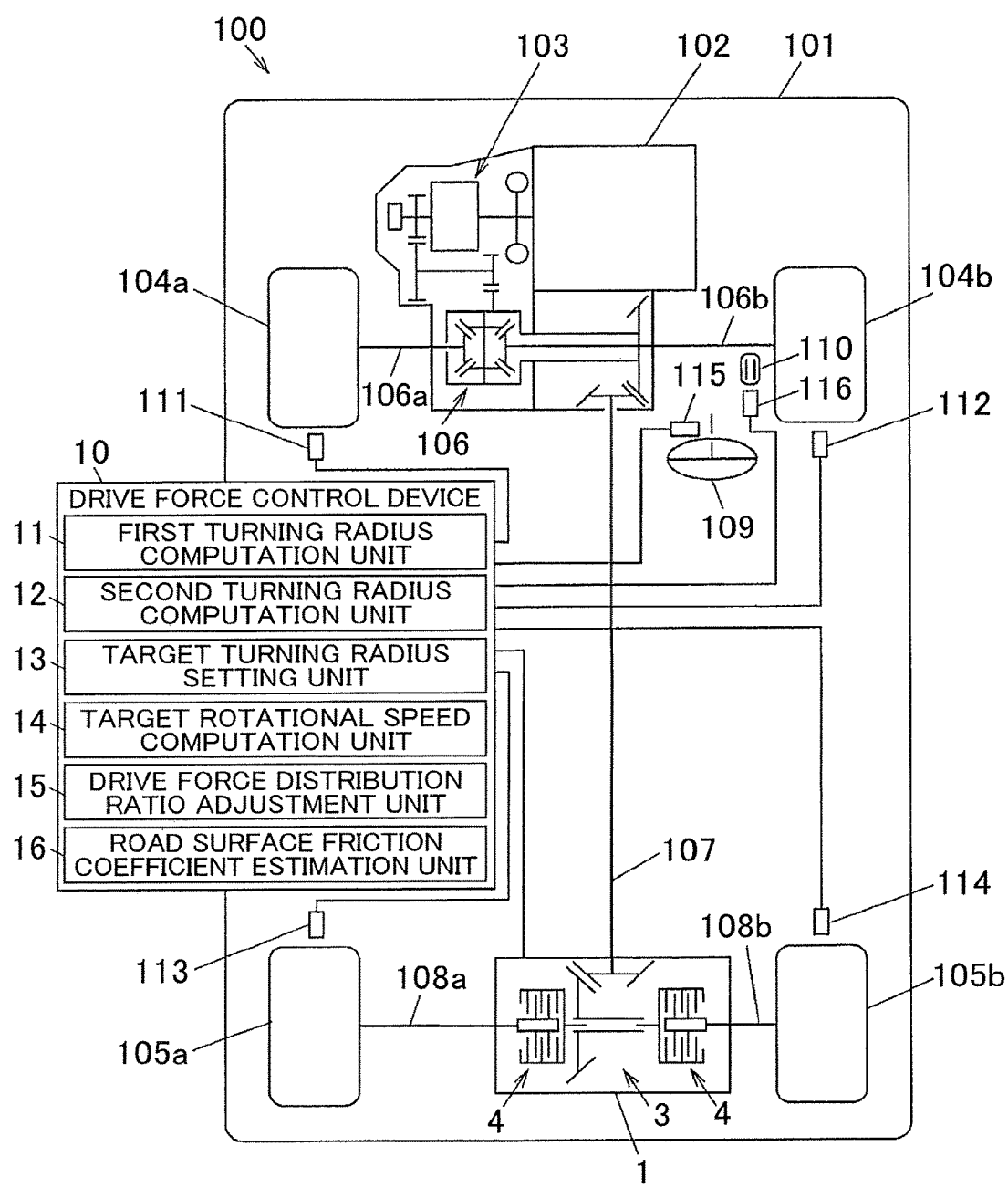
FIG. 1 is a schematic diagram illustrating an example of the configuration of a four-wheel-drive vehicle according to a first embodiment of the present invention.

FIG. 1 is a schematic diagram illustrating a schematic example of the configuration of a four-wheel-drive vehicle according to a first embodiment of the present invention. As illustrated in FIG. 1, a four-wheel-drive vehicle 100 includes a vehicle body 101, an engine 102, a transmission 103, right and left front wheels 104b and 104a (right and left wheels on the front side), and right and left rear wheels 105b and 105a (right and left wheels on the rear side). The engine 102 serves as a drive source that generates torque for travel. The right and left front wheels 104b and 104a serve as a pair of right and left main drive wheels to which a drive force of the engine 102 is always transferred. The right and left rear wheels 105b and 105a serve as a pair of right and left auxiliary drive wheels to which a drive force of the engine 102 is transferred intermittently in accordance with the travel state.

The four-wheel-drive vehicle 100 also includes, as a drive force transfer system, a front differential 106, a propeller shaft 107, and a drive force distribution device 1. The drive force of the engine 102, the speed of which has been varied by the transmission 103, is always transferred to the right and left front wheels 104b and 104a via the front differential 106 and a pair of drive shafts 106b and 106a. The right and left front wheels 104b and 104a are steered by an operation of a steering wheel 109 by a driver.

The drive force of the engine 102, the speed of which has been varied by the transmission 103, is transferred to the right and left rear wheels 105b and 105a via the propeller shaft 107, the drive force distribution device 1, and a pair of drive shafts 108b and 108a. The drive force distribution device 1 can distribute the drive force of the engine 102 to the left rear wheel 105a and the right rear wheel 105b at variable distribution ratios. The configuration of the drive force distribution device 1 will be discussed in detail later.

The four-wheel-drive vehicle 100 includes a drive force control device 10 that controls the drive force distribution device 1. The drive force control device 10 can adjust the drive forces to be transferred to the left rear wheel 105a and the right rear wheel 105b independently of each other. The drive force control device 10 has a first turning radius computation unit 11, a second turning radius computation unit 12, a target turning radius setting unit 13, a target rotational speed computation unit 14, a drive force distribution ratio adjustment unit 15, and a road surface friction coefficient estimation unit 16. The drive force control device 10 will be discussed in detail later.

Rotational speed sensors 111 to 114 are connected to the drive force control device 10. The rotational speed sensors 111 to 114 are configured to detect the rotational speeds of the right and left front wheels 104b and 104a and the right and left rear wheels 105b and 105a. The rotational speed sensors 111 to 114 are each composed of a Hall IC disposed to face a magnetic ring that has a plurality of magnetic poles that rotate together with the right and left front wheels 104b and 104a and the right and left rear wheels 105b and 105a, for example, and output a pulse signal in cycles that match the rotational speed. This enables the drive force control device 10 to detect the rotational speeds of the right and left front wheels 104b and 104a and the right and left rear wheels 105b and 105a.

A steering angle sensor 115 is also connected to the drive force control device 10. The steering angle sensor 115 detects the rotational angle (steering angle) of the steering wheel 109 from the neutral position. This enables the drive force control device 10 to detect the steering angle of the steering wheel 109.

An accelerator operation amount sensor 116 is further connected to the drive force control device 10. The accelerator operation amount sensor 116 detects the amount by which an accelerator pedal 110 is depressed. This enables the drive force control device 10 to detect the accelerator operation amount which matches the amount by which the accelerator pedal 110 is depressed.

Figure 2:
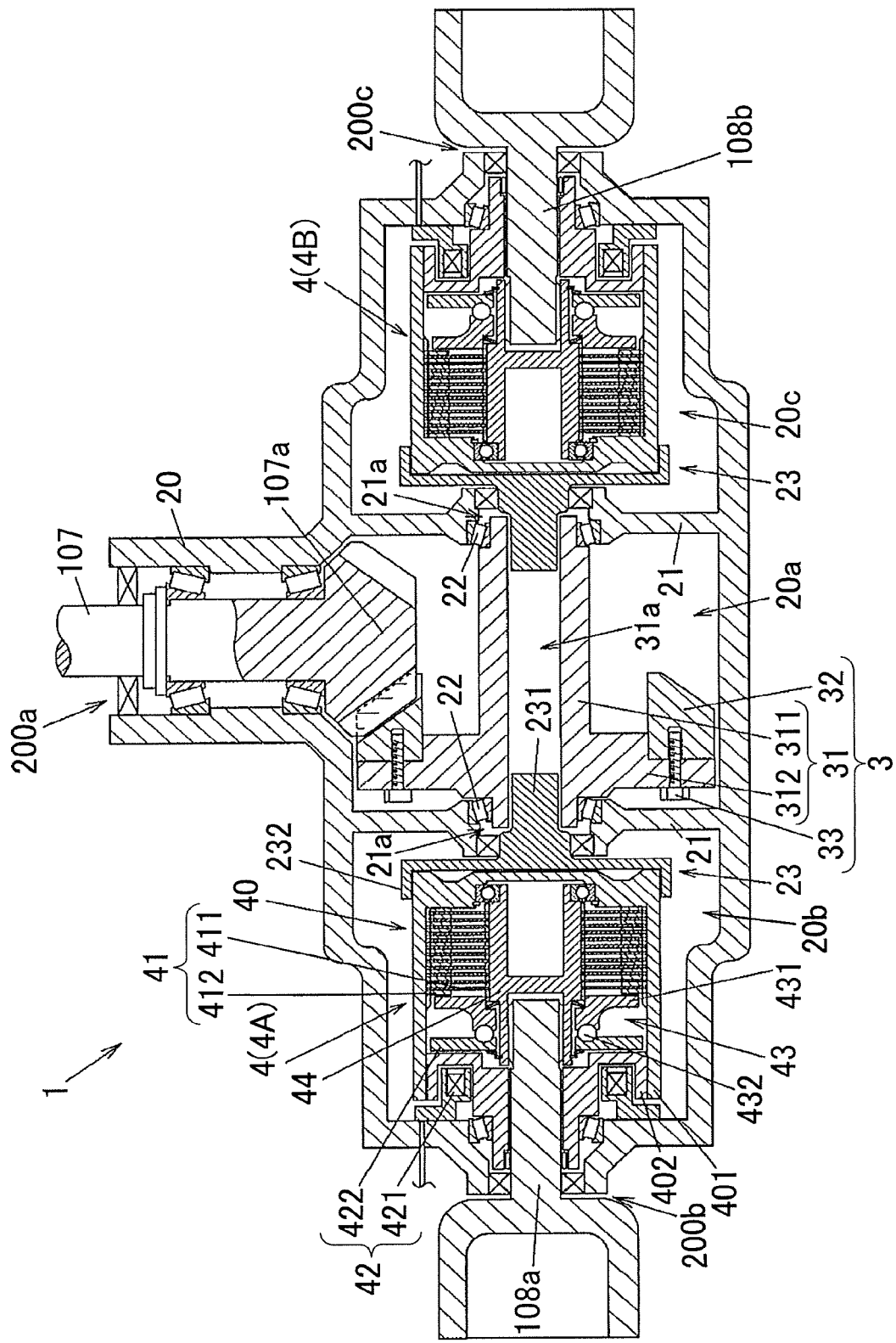
FIG. 2 is a sectional view illustrating an example of the configuration of a drive force distribution device.

FIG. 2 is a sectional view illustrating an example of the configuration of the drive force distribution device 1.

The drive force distribution device 1 includes a case member 20, an input rotary member 3, and a pair of torque couplings 4. The case member 20 has first to third housing spaces 20a to 20c inside. The input rotary member 3 is housed in the first housing space 20a of the case member 20. The pair of torque couplings 4 are housed in the second and third housing spaces 20b and 20c which interpose the first housing space 20a.

The torque coupling 4 which is housed in the second housing space 20b and the torque coupling 4 which is housed in the third housing space 20c have a common configuration. In the case where it is necessary to distinguish the torque couplings 4 from each other in the following description, the torque coupling 4 which is housed in the second housing space 20b will be referred to as a first torque coupling 4A, and the torque coupling 4 which is housed in the third housing space 20c will be referred to as a second torque coupling 4B.

The case member 20 is provided with a pair of partition walls 21 that separate the first housing space 20a and the second housing space 20b from each other and that separate the first housing space 20a and the third housing space 20c from each other. The pair of partition walls 21 are each formed with a through hole 21a that communicates the first housing space 20a with the second and third housing spaces 20b and 20c.

The input rotary member 3 has a first member 31 and a second member 32. The first member 31 is rotatably supported by the case member 20. The second member 32 is an annular ring gear. The first member 31 and the second member 32 are coupled to each other by a plurality of bolts 33. The first member 31 has a cylindrical portion 311 and a flange portion 312 that are integral with each other. A through hole 31a is formed in the center portion of the cylindrical portion 311 which is in a cylindrical shape. The flange portion 312 is formed to project outward from the outer peripheral surface of the cylindrical portion 311. The second member 32 is fixed to the distal end portion of the flange portion 312, and meshed with a gear portion 107a formed at one end of the propeller shaft 107 which is inserted through a first opening 200a of the case member 20. The first member 31 is rotatably supported by a pair of bearings 22 disposed between the inner surfaces of the through holes 21a and the first member 31.

The torque couplings 4 each have a multi-plate clutch 41, an electromagnetic clutch 42, a cam mechanism 43, an inner shaft 44, and a housing 40 that houses such components.

The housing 40 is composed of a first housing member 401 and a second housing member 402 coupled so as not to be rotatable relative to each other. The first housing member 401 has a bottomed cylindrical shape. The second housing member 402 is disposed so as to block an end portion of the first housing member 401 on the opening side.

The multi-plate clutch 41 is disposed between the first housing member 401 of the housing 40 and the inner shaft 44 which is in a cylindrical shape. The multi-plate clutch 41 is composed of inner clutch plates 411 and outer clutch plates 412. The inner clutch plates 411 are spline-engaged with the outer peripheral surface of the inner shaft 44 so as not to be relatively rotatable. The outer clutch plates 412 are spline-engaged with the inner peripheral surface of the first housing member 401 so as not to be relatively rotatable.

The electromagnetic clutch 42 has an annular coil 421 and an armature cam 422, and is disposed on the rotational axis of the housing 40. The electromagnetic clutch 42 is configured to move the armature cam 422 toward the coil 421 through generation of an electromagnetic force by the coil 421, and to frictionally slide the armature cam 422 against the second housing member 402.

The cam mechanism 43 has a main cam 431 and cam followers 432. The main cam 431 is parallel to the armature cam 422 along the rotational axis of the housing 40. The cam followers 432 are in a spherical shape, and are interposed between the main cam 431 and the armature cam 422. The cam followers 432 can roll in respective cam grooves formed in the armature cam 422 and the main cam 431 so as to extend in the circumferential direction. The cam grooves are gradually varied in depth in the axial direction in accordance with the position in the circumferential direction. The cam mechanism 43 is configured such that the armature cam 422 receives a rotational force from the housing 40 through energization of the coil 421 and converts the rotational force into a pressing force that serves as a clutch force of the multi-plate clutch 41.

When the amount of energization of the coil 421 becomes larger, the friction force between the armature cam 422 and the second housing member 402 is increased, and the main cam 431 presses the multi-plate clutch 41 more strongly. That is, the torque coupling 4 can variably control the pressing force of the multi-plate clutch 41 in accordance with the amount of energization of the coil 421, and hence can adjust the amount of torque transferred between the housing 40 and the inner shaft 44.

One end of the drive shaft 108a for the left rear wheel, which is inserted through a second opening 200b of the case member 20, is coupled to the inner shaft 44 in the first torque coupling 4A through spline fitting such that the drive shaft 108a is not rotatable relative to the inner shaft 44. Meanwhile, one end of the drive shaft 108b for the right rear wheel, which is inserted through a third opening 200c of the case member 20, is coupled to the inner shaft 44 in the second torque coupling 4B through spline fitting such that the drive shaft 108b is not rotatable relative to the inner shaft 44. The multi-plate clutch 41 in the first torque coupling 4A is an embodiment of the "left clutch" of the present invention which transfers a drive force to the left rear wheel 105a. The multi-plate clutch 41 in the second torque coupling 4B is an embodiment of the "right clutch" of the present invention which transfers a drive force to the right rear wheel 105b.

The housings 40 of the first torque coupling 4A and the second torque coupling 4B and the cylindrical portion 311 of the first member 31 of the input rotary member 3 are coupled by a pair of coupling members 23 such that the housings 40 are not rotatable relative to the cylindrical portion 311. The coupling members 23 each have a columnar boss portion 231 and a disk-shaped flange portion 232 that are integral with each other. The boss portions 231 are spline-fitted with the inner surface of the through hole 31a of the first member 31 so as not to be relatively rotatable. The flange portions 232 are spline-fitted with the housings 40 so as not to be relatively rotatable. The boss portions 231 are inserted through the through holes 21a of the partition walls 21.

An excitation current is supplied from the drive force control device 10 to the coils 421 of the torque couplings 4. The drive force control device 10 can control a drive force transferred from the input rotary member 3 to the left rear wheel 105a by increasing and decreasing a current supplied to the coil 421 of the first torque coupling 4A. Meanwhile, the drive force control device 10 can control a drive force transferred from the input rotary member 3 to the right rear wheel 105b by increasing and decreasing a current supplied to the coil 421 of the second torque coupling 4B.

The drive force control device 10 includes a CPU and a storage element, for example. When the CPU executes a process on the basis of a program stored in the storage element, the drive force control device 10 functions as the first turning radius computation unit 11, the second turning radius computation unit 12, the target turning radius setting unit 13, the target rotational speed computation unit 14, the drive force distribution ratio adjustment unit 15, and the road surface friction coefficient estimation unit 16.

Figure 3:
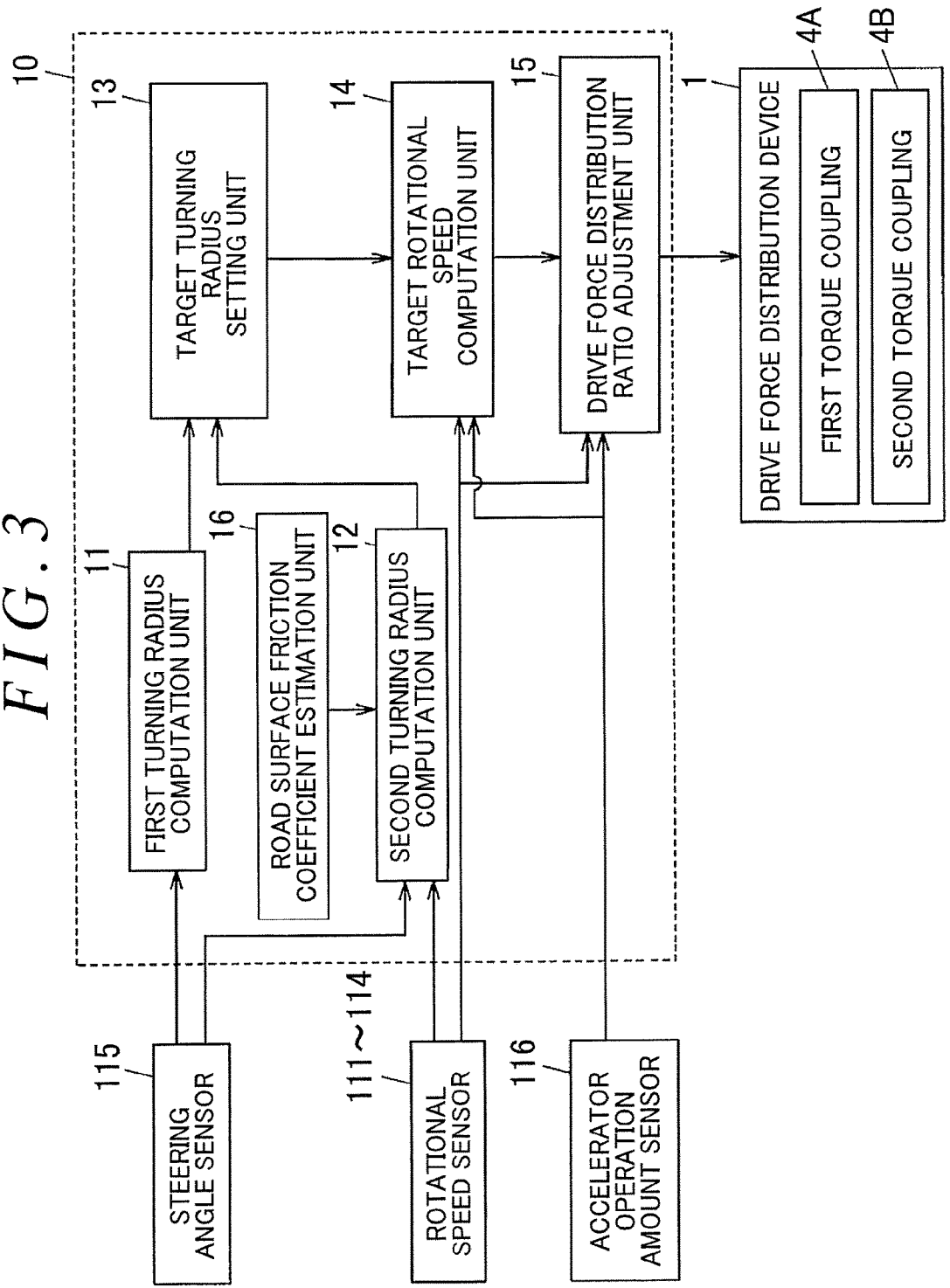
FIG. 3 is a diagram illustrating an example of the control configuration of a drive force control device in the form of a block diagram.

FIG. 3 is a diagram illustrating an example of the control configuration of the drive force control device 10 in the form of a block diagram. The first turning radius computation unit 11 computes a steering angle-based turning radius which is a turning radius of the vehicle determined in accordance with the steering angle which is detected by the steering angle sensor 115. In the embodiment, the steering angle-based turning radius is computed on the basis of the vehicle speed which is obtained from the steering angle and signals output from the rotational speed sensors 111 to 114. The steering angle-based turning radius is a turning radius for a case where the four-wheel-drive vehicle 100 travels at a steering angle detected by the steering angle sensor 115 when the wheels (right and left front wheels 104b and 104a and the right and left rear wheels 105b and 105a) are not idling (slipping).

The second turning radius computation unit 12 computes a limit turning radius, which is the minimum value of a turning radius with which the vehicle is able to turn while keeping a stable travel state, in accordance with the vehicle speed. The phrase "turn while keeping a stable travel state" refers to turning while maintaining a state in which the wheels grip on the road surface without causing oversteer that requires countersteer, for example. In the embodiment, the limit turning radius is computed in consideration of the friction coefficient of the road surface which is estimated by the road surface friction coefficient estimation unit 16 to be discussed later. The limit turning radius becomes larger as the estimated value of the road surface friction coefficient which is computed by the road surface friction coefficient estimation unit 16 is smaller.

The target turning radius setting unit 13 sets the steering angle-based turning radius, which is computed by the first turning radius computation unit 11, as a target turning radius in the case where the steering angle-based turning radius is larger than the limit turning radius, which is computed by the second turning radius computation unit 12, and sets the limit turning radius as the target turning radius in the case where the steering angle-based turning radius is smaller than the limit turning radius. In other words, the target turning radius setting unit 13 sets the larger one of the steering angle-based turning radius and the limit turning radius as the target turning radius.

The target rotational speed computation unit 14 computes respective target rotational speeds for the right and left rear wheels 105b and 105a on the basis of the target turning radius, which is set by the target turning radius setting unit 13, and the vehicle speed. The target rotational speeds are the rotational speeds of the left rear wheel 105a and the right rear wheel 105b for a case where the four-wheel-drive vehicle 100 travels while keeping a stable travel state through a turning road with the target turning radius at the vehicle speed which is obtained from signals output from the rotational speed sensors 111 to 114. In the embodiment, a target slip angle is obtained from the accelerator operation amount and the vehicle speed, and the target rotational speeds are computed on the basis of the target slip angle.

Figure 4:
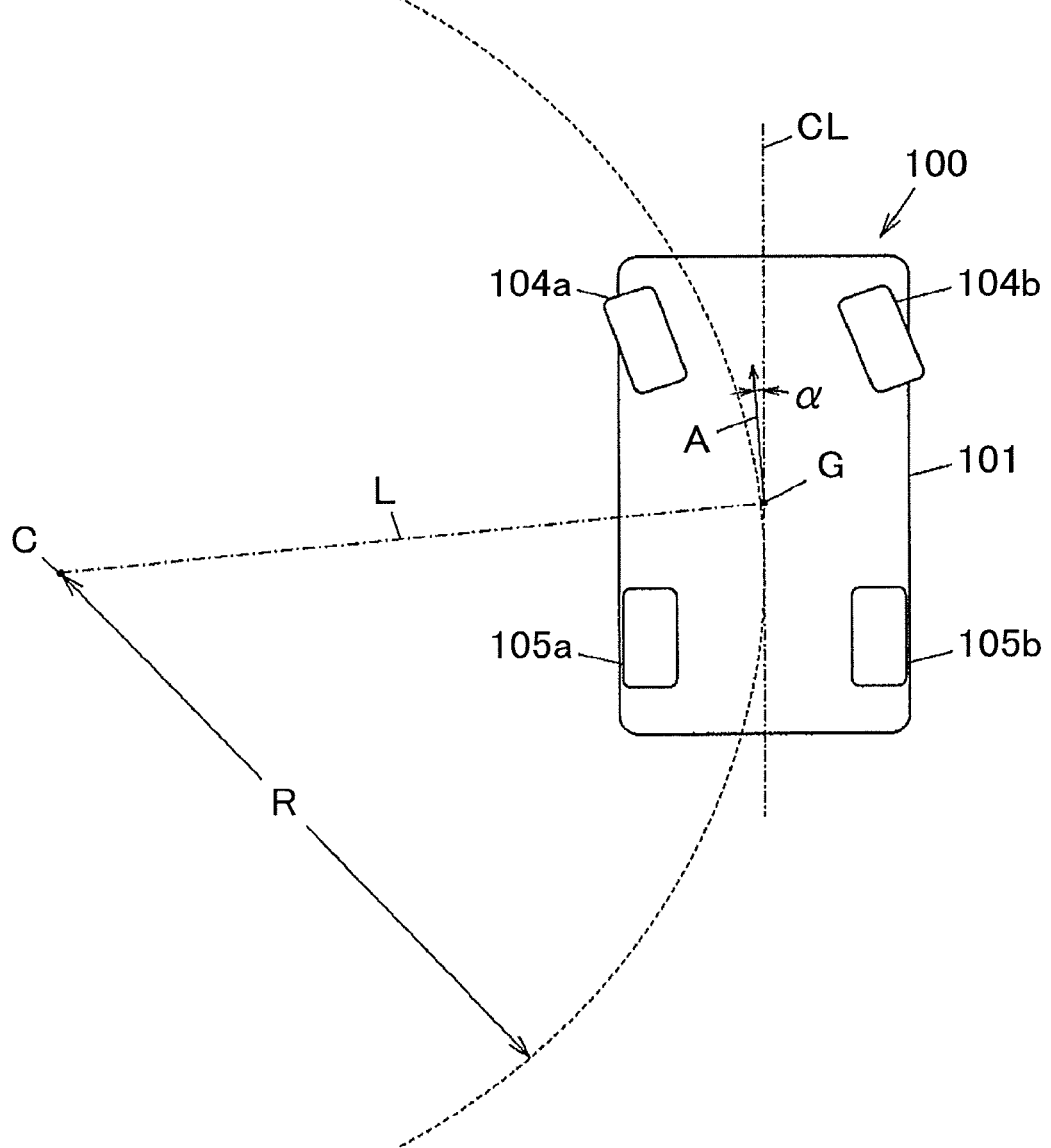
FIG. 4 is a diagram illustrating a target slip angle at the time when the four-wheel-drive vehicle is traveling through a curve.

FIG. 4 is a diagram illustrating a target slip angle α at the time when the four-wheel-drive vehicle 100 is traveling through a curve with a turning radius R. The target slip angle α is an angle formed by the direction which is perpendicular to a line segment L that connects between a turning center point C and a center-of-gravity point G of the four-wheel-drive vehicle 100 (the direction of movement of the center of gravity indicated by the arrow A in FIG. 4) and a vehicle center line CL that extends in the front-rear direction of the four-wheel-drive vehicle 100 through the center-of-gravity point G. The target rotational speed computation unit 14 obtains the target slip angle α with reference to a map stored in the storage element, for example, and calculates the target rotational speeds through computation using the obtained target slip angle α. In this case, the map which is referenced by the target rotational speed computation unit 14 defines the relationship among the accelerator operation amount, the vehicle speed, and the target slip angle α.

The drive force distribution ratio adjustment unit 15 adjusts the ratios of distribution of the drive force to the right and left rear wheels 105b and 105a such that the actual rotational speeds of the right and left rear wheels 105b and 105a which are obtained from signals output from the rotational speed sensors 113 and 114 approximate the target rotational speeds. More specifically, with reference to a drive force that matches the amount by which the accelerator pedal 110 is depressed which is detected by the accelerator operation amount sensor 116, the drive force to be transferred to the left rear wheel 105a via the multi-plate clutch 41 of the first torque coupling 4A is increased if the actual rotational speed of the left rear wheel 105a which is obtained from a signal output from the rotational speed sensor 113 is lower than the target rotational speed which is set by the target rotational speed computation unit 14, and the drive force to be transferred to the left rear wheel 105a is reduced if the actual rotational speed of the left rear wheel 105a is higher than the target rotational speed. The drive force to be transferred to the right rear wheel 105b via the multi-plate clutch 41 of the second torque coupling 4B is also adjusted in the same manner.

The road surface friction coefficient estimation unit 16 estimates the friction coefficient of the road surface on the basis of the outside temperature, the tire reaction force during steering, the frequency of operation of a wiper, the state of the road surface which is grasped from an image that captures the road surface, etc., for example.

The drive force control device 10 executes the processes of the first turning radius computation unit 11, the second turning radius computation unit 12, the target turning radius setting unit 13, the target rotational speed computation unit 14, the drive force distribution ratio adjustment unit 15, and the road surface friction coefficient estimation unit 16 repeatedly in control cycles of 5 ms, for example. That is, the drive force control device 10 computes a steering angle-based turning radius and a limit turning radius, sets the larger one of the steering angle-based turning radius and the limit turning radius as a target turning radius, computes respective target rotational speeds for the right and left rear wheels 105b and 105a on the basis of the target turning radius and the vehicle speed, and adjusts the ratios of distribution of the drive force to the right and left rear wheels 105b and 105a such that the actual rotational speeds of the right and left rear wheels 105b and 105a approximate the target rotational speeds, in predetermined control cycles.

With the first embodiment described above, in the case where the steering wheel 109 is operated to a greater degree than a steering angle corresponding to the limit turning radius, respective target rotational speeds for the right and left rear wheels 105b and 105a are computed on the basis of the target turning radius, which is set to the limit turning radius, and the vehicle speed, and the drive forces for the right and left rear wheels 105b and 105a are adjusted such that the actual rotational speeds of the right and left rear wheels 105b and 105a approximate the computed target rotational speeds. Consequently, it is possible to suppress an excessive oversteer state, and to stabilize the behavior of the four-wheel-drive vehicle 100.

In the embodiment, the limit turning radius is computed in consideration of the friction coefficient of the road surface which is estimated by the road surface friction coefficient estimation unit 16. Thus, the limit turning radius can be computed with higher precision, and the limit turning radius can be prevented from becoming larger than necessary, for example.

In the embodiment, the target rotational speeds for the right and left rear wheels 105b and 105a are computed on the basis of the target slip angle. Thus, the target rotational speeds can be computed accurately.

In the embodiment, further, the drive forces are transferred to the left rear wheel 105a and the right rear wheel 105b via the respective multi-plate clutches 41 of the first and second torque couplings 4A and 4B. Thus, the ratios of distribution of the drive force to the right and left rear wheels 105b and 105a can be adjusted easily and reliably.

A second embodiment of the present invention will be described next with reference to FIGS. 5 to 7. The configuration of a drive force distribution device 1A according to the second embodiment, which distributes a drive force to the right and left rear wheels 105b and 105b, is different from that of the drive force distribution device 1 according to the first embodiment. Differences of the second embodiment from the first embodiment will be mainly described below.

Figure 5:
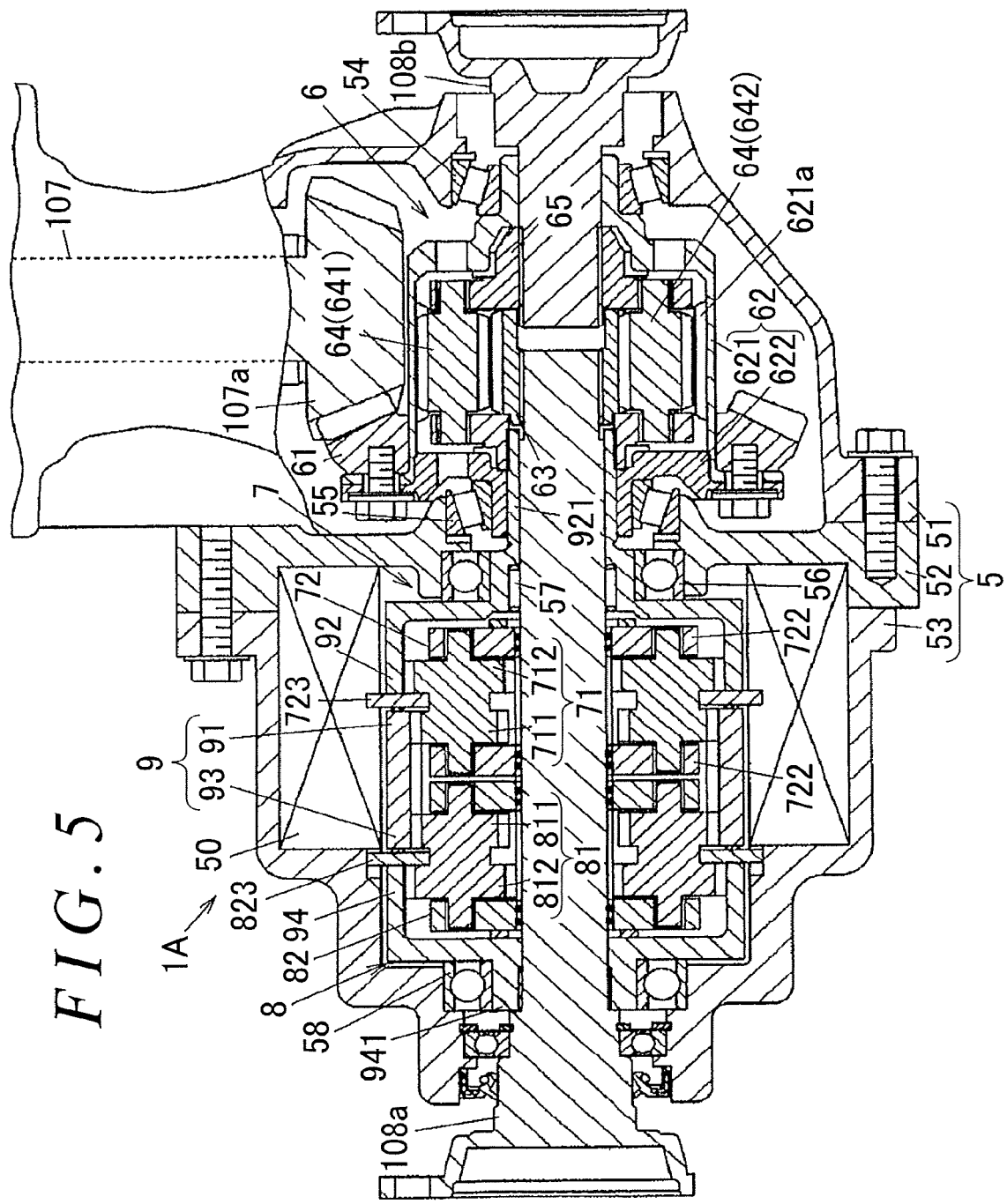
FIG. 5 is a sectional view illustrating the configuration of a drive force distribution device according to a second embodiment.

FIG. 5 is a sectional view illustrating the configuration of a drive force distribution device 1A according to a second embodiment. FIG. 6 is a diagram illustrating a schematic configuration of the drive force distribution device 1A. FIG. 7 is a perspective view illustrating a planetary carrier 72 that holds a plurality of planetary gears 71.

The drive force distribution device 1A is configured to have a case member 5, a motor 50, a differential gear mechanism 6, a planetary gear mechanism 7, and a speed change mechanism 8. The motor 50 is integrated in the case member 5. The differential gear mechanism 6 distributes a drive force input from the propeller shaft 107 to the pair of drive shafts 108*a* and 108*b* while allowing differential motion. The motor 50 is controlled by a drive force control device 10A.

The case member 5 is formed by coupling first to third members 51 to 53 to each other. The differential gear mechanism 6 is housed in the first member 51. The planetary gear mechanism 7 and the speed change mechanism 8 are housed in the third member 53. The second member 52 is disposed between the first member 51 and the third member 53.

The differential gear mechanism 6 has a ring gear 61 and a differential case 62. The ring gear 61 is meshed with the gear portion 107*a* of the propeller shaft 107. The differential case 62 rotates together with the ring gear 61. The differential case 62 is rotatably supported by bearings 54 and 55 coaxially with the pair of drive shafts 108*a* and 108*b*, and constituted by coupling a body portion 621 and a lid portion 622 to each other. An internal gear 621*a* is formed on the inner peripheral surface of the body portion 621 which is in a bottomed cylindrical shape. The lid portion 622 is disposed on the opening side of the body portion 621.

A sun gear 63 disposed in the differential case 62 is coupled so as to rotate together with the drive shaft 108*a*. A plurality of planetary gear pairs 64 are disposed between the sun gear 63 and the inner peripheral surface of the body portion 621 of the differential case 62. The planetary gear pairs 64 are each composed of a first planetary gear 641 and a second planetary gear 642. The first planetary gear 641 is meshed with the internal gear 621*a*. The second planetary gear 642 is meshed with the sun gear 63. The first planetary gear 641 and the second planetary gear 642 are rotatably and revolvably held by a planetary carrier 65 while being meshed with each other. The planetary carrier 65 is coupled so as not to be rotatable relative to the drive shaft 108*b* in the differential case 62.

A drive force input from the propeller shaft 107 is transferred from the ring gear 61 to the differential case 62. The input drive force is transferred to the drive shafts 108*a* and 108*b* when the sun gear 63 and the planetary carrier 65, which are coupled to the differential case 62 via the plurality of planetary gear pairs 64, are rotated. In the case where there occurs a difference in rotation between the right and left rear wheels 105*b* and 105*a*, such as during a turn of the vehicle, the first planetary gear 641 and the second planetary gear 642 revolve around the sun gear 63 while rotating. Consequently, the differential gear mechanism 6 distributes the drive force which is input from the propeller shaft 107 to the pair of drive shafts 108*a* and 108*b* while allowing differential motion.

Figure 6:
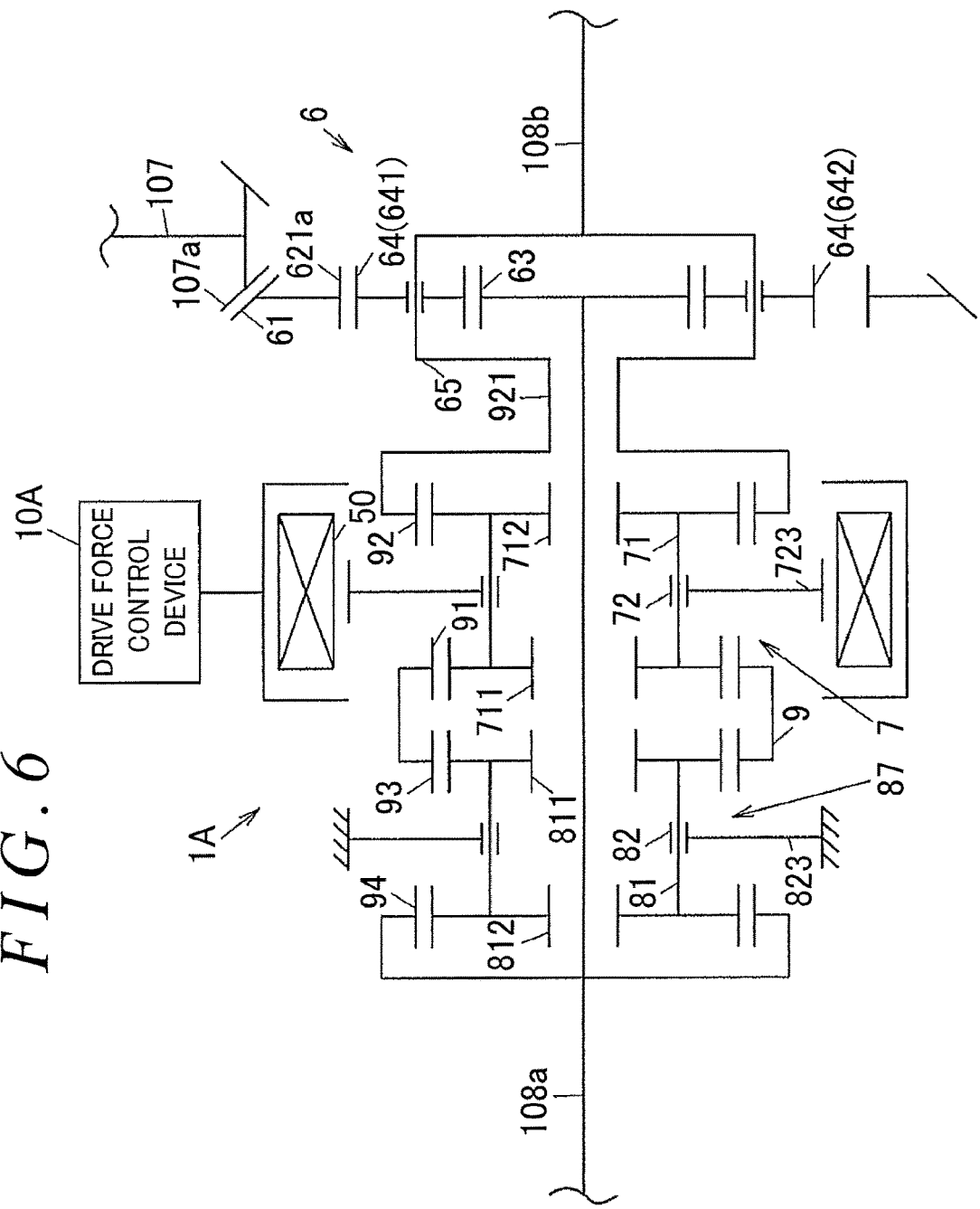
FIG. 6 is a diagram illustrating a schematic configuration of the drive force distribution device.

As illustrated in FIG. 6, the planetary gear mechanism 7 and the speed change mechanism 8 are provided between the drive shaft 108*a* and the drive shaft 108*b*. The planetary gear mechanism 7 can cause a difference in rotation between the drive shafts 108*a* and 108*b*. The speed change mechanism 8 is disposed adjacent to the planetary gear mechanism 7. The planetary gear mechanism 7 and the speed change mechanism 8 are an embodiment of the gear mechanism according to the present invention which varies the rotational speed difference between the left rear wheel 105*a* and the right rear wheel 105*b*.

The planetary gear mechanism 7 is drivably coupled to the motor 50 which is formed in a hollow shape, and generates a difference in rotation between the drive shafts 108*a* and 108*b* on the basis of motor torque output from the motor 50. The planetary gear mechanism 7 includes the plurality of (four) planetary gears 71 and the planetary carrier 72. The planetary gears 71 are each constituted by coupling a first pinion 711 and a second pinion 712, which have different pitch circle diameters, so as not to be relatively rotatable. The planetary carrier 72 revolvably and rotatably supports the planetary gears 71. The planetary gears 71 are formed such that the pitch circle diameter of the second pinions 712 is slightly larger than the pitch circle diameter of the first pinions 711.

Figure 7:
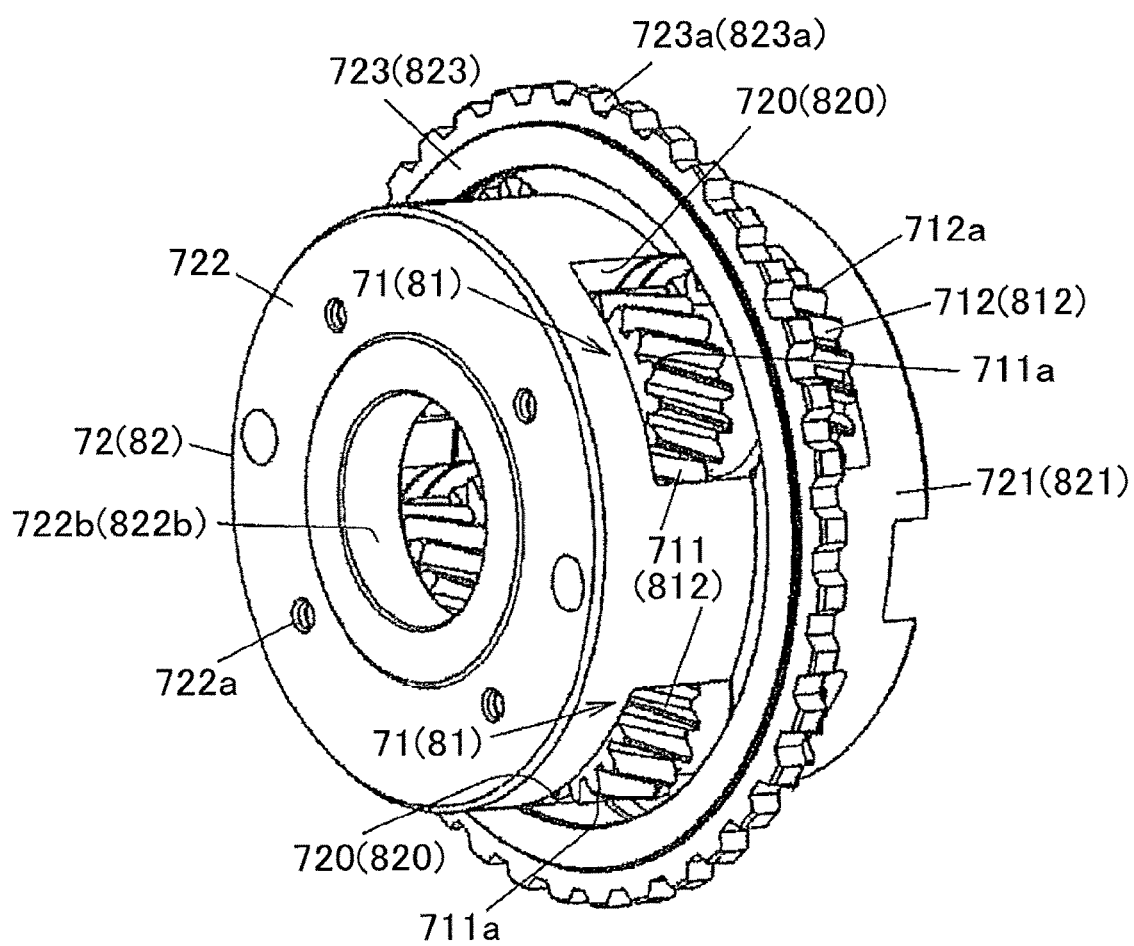
FIG. 7 is a perspective view illustrating a planetary carrier that holds a plurality of planetary gears.

As illustrated in FIG. 7, the planetary carrier 72 has a cylindrical outer peripheral wall 721 and a pair of lid portions 722 that face each other and that partially block both end portions of the outer peripheral wall 721. A plurality of opening portions 720 are formed in the outer peripheral surface of the outer peripheral wall 721. The number of the opening portions 720 corresponds to the number of the planetary gears 71. The planetary gears 71 are rotatably housed in the planetary carrier 72 with respective tooth portions 711*a* and 712*a* of the first pinions 711 and the second pinions 712 projecting outward from the opening portions 720. The gear support structure for the planetary gears 71 is similar to that for planetary gears 81 of the speed change mechanism 8 to be discussed later. Therefore, symbols corresponding to the speed change mechanism 8 are given in parentheses to omit detailed description of the configuration of the speed change mechanism 8.

Support holes 722*a* are formed in the lid portions 722 of the planetary carrier 72 so as to face each other at positions corresponding to the opening portions 720. The planetary gears 71 are supported so as to be rotatable with respect to the planetary carrier 72 with shaft portions of the planetary gears 71, which extend along the axial direction, inserted into the support holes 722*a*.

Insertion holes 722*b* are formed in the center portions of the lid portions 722 of the planetary carrier 72. The insertion holes 722*b* enable insertion of the drive shaft 108*a* along the axial direction. The planetary carrier 72 is rotatably supported by the drive shaft 108*a* with the drive shaft 108*a* inserted through the insertion holes 722*b*.

A first ring gear 91 and a second ring gear 92 are meshed with the first pinions 711 and the second pinions 712, respectively, which project outward via the opening portions 720 of the planetary carrier 72. The second ring gear 92 which is meshed with the second pinions 712 is coupled so as not to be rotatable relative to the planetary carrier 65 which constitutes the differential gear mechanism 6.

The second ring gear 92 has a tubular portion 921 through which the drive shaft 108*a* is inserted. The tubular portion 921 is rotatably supported by a ball bearing 56 and a needle bearing 57. The second ring gear 92 is coupled to the drive shaft 108*b* via the planetary carrier 65 of the differential gear mechanism 6 with the distal end of the tubular portion 921 spline-fitted with the planetary carrier 65.

The outer peripheral wall 721 of the planetary carrier 72 is provided with a flange portion 723 that extends radially outward. External teeth 723*a* are formed on the outer periphery of the flange portion 723. The flange portion 723 is coupled to the motor 50.

The motor 50 is composed of a brushless motor, for example. The motor 50 is disposed coaxially on the radially outer side of the planetary gear mechanism 7, and rotated by a motor current supplied from the drive force control device 10A. The drive force control device 10A uses a battery (not illustrated) as a power supply source, and adjusts a motor current through switching based on PWM control. The planetary carrier 72 is coupled to the motor 50 with the flange portion 723, which is provided on the outer peripheral wall 721, spline-fitted with the inner periphery of a rotor of the motor 50.

The drive force distribution device 1A includes the speed change mechanism 8 which is configured to correct the speed change ratio which is set for the planetary gear mechanism 7. The first ring gear 91 which is meshed with the first pinions 711 of the planetary gear 71 is coupled to the drive shaft 108a via the speed change mechanism 8. That is, the planetary gear mechanism 7 has a predetermined gear ratio based on the difference in pitch circle diameter between the first pinions 711 and the second pinions 712 of the planetary gear 71. Thus, in the case where the speed change mechanism 8 were not provided, the planetary carrier 72 would be rotated even if no differential motion were caused between the drive shafts 108a and 108b during travel, and a load would be imposed on the motor 50 etc.

Therefore, in the embodiment, the speed change mechanism 8 which cancels out the speed change ratio which is set for the planetary gear mechanism 7 is interposed between the first ring gear 91 of the planetary gear mechanism 7 and the drive shaft 108a. Consequently, the motor 50 is configured not to be rotated, even during travel, in the case where no differential motion is caused between the drive shafts 108a and 108b. That is, the motor 50 is rotated at a speed corresponding to the rotational speed difference between the drive shafts 108a and 108b. Motor torque output from the motor 50 acts to accelerate one of the right and left rear wheels 105b and 105a, and to decelerate the other. Consequently, the ratios of distribution of the drive force to the right and left rear wheels 105b and 105a are adjusted.

More specifically, the speed change mechanism 8 has a plurality of (four) planetary gears 81. The planetary gears 81 are each constituted by coupling a third pinion 811 and a fourth pinion 812 so as not to be relatively rotatable. The third pinion 811 has the same pitch circle diameter as that of the first pinion 711 which constitutes the planetary gear 71. The fourth pinion 812 has the same pitch circle diameter as that of the second pinion 712. The planetary gears 81 are revolvably and rotatably supported by a planetary carrier 82. The planetary carrier 82 is rotatably supported by the drive shaft 108a which is inserted through an insertion hole 822b formed in the axial center.

A third ring gear 93 and a fourth ring gear 94 are meshed with the third pinions 811 and the fourth pinions 812 which project outward from opening portions 820 of the planetary carrier 82. The third ring gear 93 has the same configuration as that of the first ring gear 91. The fourth ring gear 94 has the same configuration as that of the second ring gear 92. The third ring gear 93, which is meshed with the third pinions 811, is coupled so as not to be rotatable relative to the first ring gear 91 on the planetary gear mechanism 7 side. The fourth ring gear 94 is coupled so as not to be rotatable relative to the drive shaft 108a. The planetary carrier 82 which supports the planetary gears 81 is coupled so as not to be rotatable relative to the third member 53 of the case member 5 with a flange portion 823 (external teeth 823a), which is provided on an outer peripheral wall 821, serving as a coupling portion.

The first ring gear 91 and the third ring gear 93 are integrally formed with each other with inner teeth of the same shape disposed in parallel at both ends of the inner periphery of a sleeve 9 which is in a tubular shape. The fourth ring gear 94 has a tubular portion 941 through which the drive shaft 108a is inserted. The tubular portion 941 is rotatably supported by a ball bearing 58. The fourth ring gear 94 is coupled so as not to be rotatable relative to the drive shaft 108a with the tubular portion 941 spline-fitted with the drive shaft 108a.

In the drive force distribution device 1A configured as described above, the planetary carrier 72 of the planetary gear mechanism 7 which is coupled to the motor 50 is not rotated in the case where no differential motion is caused between the drive shafts 108a and 108b. Meanwhile, difference in rotation can be caused between the drive shafts 108a and 108b by rotationally driving the planetary carrier 72 via the flange portion 723 using motor torque. The drive force of the engine 102 can be distributed to the drive shafts 108a and 108b at variable distribution ratios by controlling the motor torque to be input to the planetary gear mechanism 7 as control torque.

As with the drive force control device 10 according to the first embodiment, the drive force control device 10A which controls the drive force distribution device 1A has the first turning radius computation unit 11, the second turning radius computation unit 12, the target turning radius setting unit 13, the target rotational speed computation unit 14, the drive force distribution ratio adjustment unit 15, and the road surface friction coefficient estimation unit 16. However, the content of control by the drive force distribution ratio adjustment unit 15 of the drive force control device 10A is different from the content of control by the drive force distribution ratio adjustment unit 15 of the drive force control device 10.

Specifically, the drive force distribution ratio adjustment unit 15 of the drive force control device 10 according to the first embodiment adjusts the drive force which is transferred to the right and left rear wheels 105b and 105a via the multi-plate clutches 41 of the first and second torque couplings 4A and 4B. However, the drive force distribution ratio adjustment unit 15 of the drive force control device 10A according to the present embodiment adjusts the magnitude and the direction of a motor current to be supplied to the motor 50 of the drive force distribution device 1A to adjust the rotational speed difference between the right and left rear wheels 105b and 105a by the planetary gear mechanism 7 and the speed change mechanism 8 such that the actual rotational speeds of the right and left rear wheels 105b and 105a approximate the target rotational speeds which are computed by the target rotational speed computation unit 14.

Also with the second embodiment described above, as with the first embodiment, it is possible to suppress an excessive oversteer state, and to stabilize the behavior of the vehicle, even in the case where the steering wheel 109 is operated to a greater degree than a steering angle corresponding to the limit turning radius.

The present invention can be modified as appropriate without departing from the scope and spirit of the present invention. For example, the drive force control device 10, 10A has the road surface friction coefficient estimation unit 16 which estimates the friction coefficient of the road surface in the first and second embodiments. However, the present invention is not limited thereto, and the drive force control device 10, 10A may not have the road surface friction coefficient estimation unit 16. In this case, the second turning radius computation unit 12 of the drive force control device 10, 10A computes a limit turning radius using a predetermined constant set in advance as the friction coefficient of the road surface. It is desirable that the predetermined constant should be a value (e.g. 0.4 to 0.6) corresponding to the friction coefficient of a wet road, for example, which is smaller than the friction coefficient of a dry paved road (dry road), in consideration of the safety.

What is claimed is:

1. A drive force control device that controls a drive force distribution device that distributes a drive force of a drive source to right and left wheels of a vehicle at variable distribution ratios, comprising:
   a road surface friction coefficient estimation unit that estimates a friction coefficient of a road surface;
   a first turning radius computation unit that computes a steering angle-based turning radius that is a turning radius of the vehicle determined in accordance with a steering angle;
   a second turning radius computation unit that computes a limit turning radius, which is a minimum value of the turning radius with which the vehicle is turnable while keeping a stable travel state, in accordance with a vehicle speed;
   a target turning radius setting unit that sets the steering angle-based turning radius as a target turning radius in the case where the steering angle-based turning radius is larger than the limit turning radius, and that sets the limit turning radius as the target turning radius in the case where the steering angle-based turning radius is smaller than the limit turning radius;
   a target rotational speed computation unit that computes respective target rotational speeds for the right and left wheels on the basis of the target turning radius, which is set by the target turning radius setting unit, and the vehicle speed; and
   a drive force distribution ratio adjustment unit that adjusts the ratios of distribution of the drive force to the right and left wheels such that actual rotational speeds of the right and left wheels approximate the target rotational speeds,
   wherein the second turning radius computation unit computes the limit turning radius in consideration of the estimated friction coefficient of the road surface.

2. The drive force control device according to claim 1, wherein:
   the drive force distribution device has a gear mechanism that varies a rotational speed difference between the left wheel and the right wheel; and
   the drive force distribution ratio adjustment unit adjusts the rotational speed difference which is generated by the gear mechanism.

3. The drive force control device according to claim 1, wherein
   the target rotational speed computation unit computes the target rotational speeds on the basis of a target slip angle obtained from an accelerator operation amount and the vehicle speed.

4. The drive force control device according to claim 1, wherein:
   the drive force distribution device has a left clutch that transfers a drive force to the left wheel and a right clutch that transfers a drive force to the right wheel; and
   the drive force distribution ratio adjustment unit adjusts the drive forces to be transferred by the left clutch and the right clutch.

5. A method of controlling a vehicle that includes a drive force distribution device that distributes a drive force of a drive source to right and left wheels at variable distribution ratios, comprising:
   estimating a friction coefficient of a road surface;
   computing a steering angle-based turning radius that is a turning radius of the vehicle determined in accordance with a steering angle;
   computing a limit turning radius, which is a minimum value of the turning radius with which the vehicle is turnable while keeping a stable travel state, in accordance with a vehicle speed;
   setting the larger one of the steering angle-based turning radius and the limit turning radius as a target turning radius;
   computing respective target rotational speeds for the right and left wheels on the basis of the target turning radius and the vehicle speed; and
   adjusting the ratios of distribution of the drive force to the right and left wheels such that actual rotational speeds of the right and left wheels approximate the target rotational speeds,
   wherein the limit turning radius is computed in consideration of the estimated friction coefficient of the road surface.

* * * * *